(12) United States Patent
Duiker (10) Patent No.: US 11,606,498 B1
(45) Date of Patent: Mar. 14, 2023

(54) EXPOSURE OF PANORAMAS

(71) Applicant: Apple Inc., Cupertino, CA (US)

(72) Inventor: Haarm-Pieter Duiker, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/369,237

(22) Filed: Jul. 7, 2021

Related U.S. Application Data (60) Provisional application No. 63/081,863, filed on Sep. 22, 2020.

(51) Int. Cl.
  *H04N 5/232* (2006.01)
  *H04N 5/235* (2006.01)
  *H04N 5/341* (2011.01)

(52) U.S. Cl.
  CPC ....... *H04N 5/23238* (2013.01); *H04N 5/2355* (2013.01); *H04N 5/3415* (2013.01)

(58) Field of Classification Search
  CPC ............. H04N 5/23238; H04N 5/2355; H04N 5/3415; G06T 5/50
  See application file for complete search history.

(56) References Cited

U.S. PATENT DOCUMENTS

| | | | |
|---|---|---|---|
| 9,836,831 B1* | 12/2017 | Krishnaswamy | G06T 5/50 |
| 10,587,816 B1* | 3/2020 | Douady | H04N 5/23267 |
| 10,997,697 B1* | 5/2021 | Newman | G06T 7/254 |
| 2013/0229546 A1* | 9/2013 | Furumura | G06T 5/50 |
| | | | 348/229.1 |
| 2015/0146026 A1 | 5/2015 | Walker et al. | |
| 2017/0230577 A1* | 8/2017 | Ishii | G06T 5/007 |
| 2019/0281216 A1 | 9/2019 | Masamura | |
| 2019/0347771 A1* | 11/2019 | Suszek | G06T 7/194 |
| 2020/0051265 A1* | 2/2020 | Kim | G06T 5/004 |

* cited by examiner

Primary Examiner — Rowina J Cattungal
(74) Attorney, Agent, or Firm — Thompson Hine LLP (57) ABSTRACT

Various implementations disclosed herein include devices, systems, and methods that generate exposed panoramic image data of an environment. For example, an example process may include obtaining panoramic image data including pixel values corresponding to light received by one or more image capture devices from multiple angles in a physical environment, generating blurred panoramic image data by adjusting the individual pixel values based on values of a subset of other values of the pixel values, selecting an area of the blurred panoramic image data, and determining an exposure for the panoramic image data based on the area of the blurred panoramic image data.

20 Claims, 5 Drawing Sheets

```
┌─────────────────────────────────────────────┐
│ Obtain panoramic image data comprising      │
│ pixel values corresponding to light         │──202
│ received by one or more image capture       │
│ devices from multiple angles in a physical  │
│ environment                                 │
└─────────────────────────────────────────────┘
                      │
                      ▼
┌─────────────────────────────────────────────┐
│ Generate blurred panoramic image data by    │
│ adjusting the individual pixel values based │──204
│ on values of a subset of other values of    │
│ the pixel values                            │
└─────────────────────────────────────────────┘
                      │
                      ▼
┌─────────────────────────────────────────────┐
│ Select an area of the blurred panoramic     │──206
│ image data                                  │
└─────────────────────────────────────────────┘
                      │
                      ▼
┌─────────────────────────────────────────────┐
│ Determine an exposure for the panoramic     │──208
│ image data based on the area of the blurred │
│ panoramic image data                        │
└─────────────────────────────────────────────┘
```

EXPOSURE OF PANORAMAS

CROSS-REFERENCE TO RELATED APPLICATIONS

This application claims the benefit of U.S. Provisional Application Ser. No. 63/081,863 filed Sep. 22, 2020, which is incorporated herein in its entirety.

TECHNICAL FIELD

The present disclosure generally relates to adjusting images, and in particular, to systems, methods, and devices that adjust exposure of a panoramic image of a physical environment.

BACKGROUND

Various techniques are used to generate panoramic images, including High Dynamic Range (HDR) panoramas. For example, some existing techniques generate panoramic images by combining multiple sequential and/or overlapping images together (e.g., using multi-exposure techniques). The contrast range (i.e., from lightest to darkest color) of a panoramic image may not be ideal or otherwise appropriate for the content of the image or other circumstances. Existing techniques may not provide adequate exposure adjustment (i.e., contrast range adjustment) of panoramic images to account for image content and/or other circumstances.

SUMMARY

Various implementations disclosed herein include devices, systems, and methods that adjust the exposure (i.e., contrast range) of an HDR panoramic image based on an area of the image (e.g., a predetermined elevation or altitude (i.e., row) of the image data) after blurring the image. Blurring the image avoids sampling challenges that may occur if very bright or very dark points are missed. The area (e.g., a row) of the image may be representative of many and/or all horizontal directions to provide a more comprehensive exposure adjustment. In some implementations, exposed panoramic images may be generated according to implementations disclosed herein in order to provide extended reality (XR) environments that include depictions of physical environments including real physical objects and virtual content for display on mobile and/or head mounted devices (HMDs).

In general, one innovative aspect of the subject matter described in this specification can be embodied in methods that include the actions of obtaining panoramic image data including pixel values corresponding to light received by one or more image capture devices from multiple angles in a physical environment, generating blurred panoramic image data by adjusting the individual pixel values based on values of a subset of other values of the pixel values, selecting an area of the blurred panoramic image data, and determining an exposure for the panoramic image data based on the selected area of the blurred panoramic image data.

These and other embodiments can each optionally include one or more of the following features.

In some aspects, determining the exposure for the panoramic image data includes computing an average color of the selected area of the blurred panoramic image data, computing the average luminance based on the average color, inverting the average luminance, and multiplying the panoramic image data by the inverted average luminance.

In some aspects, selecting the area of the blurred panoramic image data includes selecting portions of the image data representative of all horizontal directions.

In some aspects, selecting the area of the blurred panoramic image data includes selecting portions of the panoramic image data corresponding to a selected altitude.

In some aspects, selecting the area of the blurred panoramic image data includes determining brightness values of multiple portions of the image data corresponding to different altitudes, and selecting the area of the blurred panoramic image data by identifying a portion of the multiple portions based on the brightness values.

In some aspects, generating blurred panoramic image data includes performing a weighted integration, using a wide-angled weighted blurring technique, or using a diffuse convolutional technique.

In some aspects, the panoramic image data includes spherical data representing a full 360-degree view of the physical environment from an image capture position.

In some aspects, the spherical data has a cuboid format or equirectangular format.

In some aspects, the panoramic image data is high dynamic range (HDR) data.

In some aspects, the method further includes sending a communication to the one or more image capture devices based on the exposure, wherein the image capture devices adjust image capture parameters based on the communication.

In some aspects, the method further includes rendering a view based on the panoramic image data and the determined exposure for the panoramic image data.

In some aspects, the view is rendered live during streaming of the panoramic image data.

In some aspects, the method further includes rendering a computer-generated object in a view of the physical environment based on the determined exposure.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
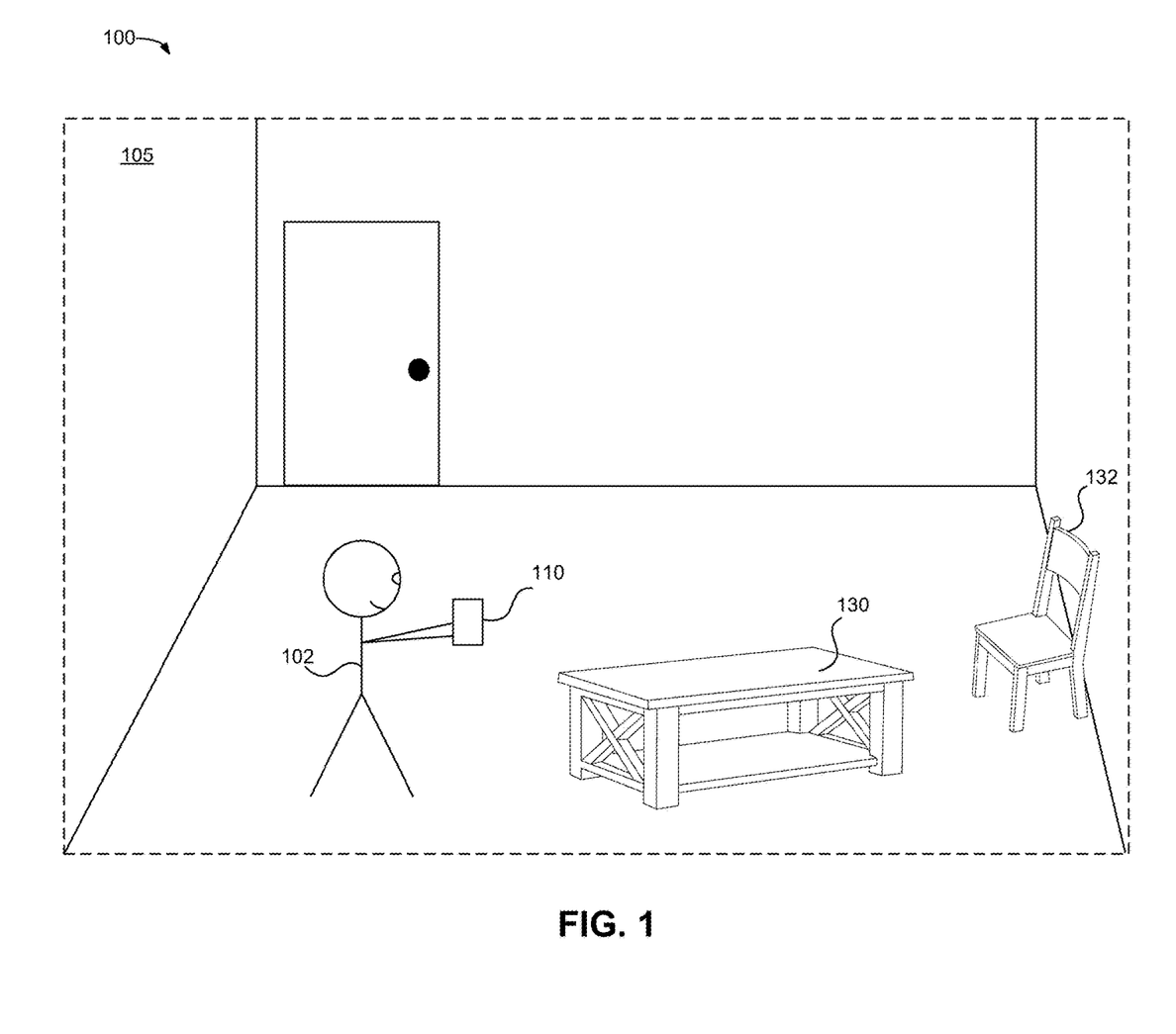
FIG. 1 is an example operating environment in accordance with some implementations.

FIG. 1 is a block diagram of an example operating environment 100 in accordance with some implementations. In this example, the example operating environment 100 illustrates an example physical environment 105 that includes a table 130 and a chair 132. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the device 110 is configured to present an environment to the user 102. In some implementations, the device 110 is a handheld electronic device (e.g., a smartphone or a tablet). In some implementations, the user 102 wears the device 110 on his/her head. As such, the device 110 may include one or more displays provided to display content. The device 110 may enclose the field-of-view of the user 102.

In some implementations, the functionalities of device 110 are provided by more than one device. In some implementations, the device 110 communicates with a separate controller or server to manage and coordinate an experience for the user. Such a controller or server may be local or remote relative to the physical environment 105.

Figure 2:
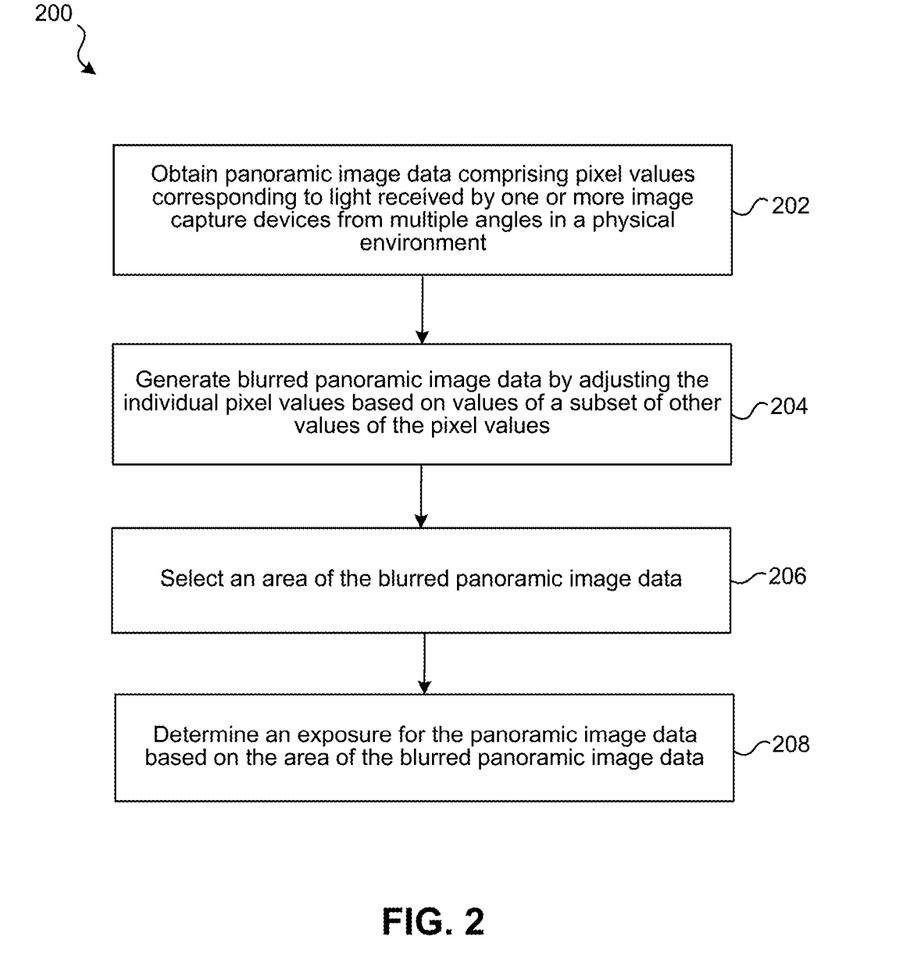
FIG. 2 is a flowchart representation of an exemplary method that can determine an exposure for panoramic image data in accordance with some implementations.

FIG. 2 is a flowchart representation of an exemplary method 200 that determines an exposure for panoramic image data based on an area of blurred panoramic image data in accordance with some implementations. In some implementations, the method 200 is performed by a device (e.g., device 110 of FIG. 1), such as a mobile device, desktop, laptop, or server device. In some implementations, the device has a screen for displaying images and/or a screen for viewing stereoscopic images such as a head-mounted display (HMD). In some implementations, the method 200 is performed by processing logic, including hardware, firmware, software, or a combination thereof. In some implementations, the method 200 is performed by a processor executing code stored in a non-transitory computer-readable medium (e.g., a memory). The determining an exposure for panoramic image data process of method 200 is illustrated with reference to FIGS. 3-4.

At block 202, the method 200 obtains panoramic image data including pixel values corresponding to light received by one or more image capture devices from multiple angles in a physical environment. For example, the panoramic image data may be spherical data representing a full 360-degree view of the environment (e.g., physical environment 105 of FIG. 1) from an image capture position. In some implementations, the spherical data has a cuboid format or an equirectangular format. In some implementations, the panoramic image data is high dynamic range (HDR) data.

In some implementations, the panoramic image includes a camera image, a digital photograph, a computer-generated image, and/or an image that combines real and virtual content (e.g., augmented reality (AR)). In some implementations, the panoramic image includes an equirectangular representation representing a 360-degree view of an environment in which left and right edges will be adjacent to one another. In some implementations, the panoramic image includes a cube map representation of a 360-degree view of a 3D environment having a surface representing a tile-able texture in which edges will be adjacent to one another. In some implementations, the panoramic image includes, or is used to generate, a texture for a three-dimensional (3D) mesh.

At block 204, the method 200 generates blurred panoramic image data by adjusting the individual pixel values based on values of a subset of other values of the pixel values. For example, a blurred panoramic image may include blurring each pixel based on what is around it. For example, the blurring may involve performing a weighted integration. Additionally, or alternatively, the blurring may involve performing a wide-angled weighted blurring technique. Additionally, or alternatively, the blurring may involve using a diffuse convolutional technique. In some implementations, blurring is performed in angular terms rather than pixel terms, e.g., using a blurring function that blurs based an angular parameter/direction. For example, this may involve integrating values based on a direction, e.g., in each hemisphere of a spherical representation.

Alternatively, in some implementations the diffuse convolution may be augmented with a power function. A power function could serve the purpose of focusing the blurring effect. For the example, a full hemisphere could still be integrated over for each direction in the panorama image, but the directions closer to a given source direction may be more heavily weighted. This could be useful in some instances depending on the particular panoramic image.

At block 206, the method 200 selects an area of the blurred panoramic image data. In some implementations, the area may be selected to select or sample from portions of the image corresponding to representative horizontal directions. In some implementations, the area may be selected to select or sample from portions of the image corresponding to all horizontal directions. For example, the selected area of panoramic image data may correspond to a particular elevation or altitude. Additionally, or alternatively, the selected area of panoramic image data may correspond to selecting the brightest row (e.g., elevation or altitude) in the blurred panoramic image data.

In some implementations, selecting the area of the blurred panoramic image data includes selecting portions of the panoramic image data corresponding to a selected altitude. In some implementations, selecting the area of the blurred panoramic image data includes determining brightness values of multiple portions of the image data corresponding to different altitudes, and selecting the area of the blurred panoramic image data by identifying a portion of the multiple portions based on the brightness values.

At block 208, the method 200 determines an exposure (i.e., a shift to the contrast range) for the panoramic image data based on the area of the blurred panoramic image data. In some implementations, determining the exposure for the panoramic image data may include computing an average color of the selected area of the blurred panoramic image data. Additionally, or alternatively, determining the exposure for the panoramic image data may include computing the average luminance based on the average color. Additionally, or alternatively, determining the exposure for the panoramic image data may further include inverting the average luminance and multiplying the panoramic image data by the inverted average luminance.

In some implementations, the method 200 further involves sending a communication to the one or more image capture devices based on the exposure. In some implementations, the image capture devices adjust image capture parameters based on the communication. For example, a feedback loop may be used cause the one or more image capture devices adjust exposure during the live capture of a video or other sequence of images.

In some implementations, the method 200 further involves rendering a view based on the panoramic image data and the determined exposure for the panoramic image data. In some implementations, the view is rendered live during capturing and/or streaming of the panoramic image data. For example, during a live streaming of a sporting event, such as a basketball game, augmented reality content could be generated (e.g., a shot clock on the basketball floor) using the real-time capture of panoramic image data. The adjusted exposure of the panoramic image data allows the generation of the computer-generated content to be properly (e.g., realistically) rendered for optimal viewing performance for the end user (e.g., fans watching games at home).

In some implementations, the method 200 involves rendering a computer-generated object in a view of the physical environment based on the determined exposure. For example, the adjusted exposure of the panoramic image data allows the generation of the computer-generated content to be properly (e.g., realistically) rendered for optimal viewing performance for CG content.

Figure 3:
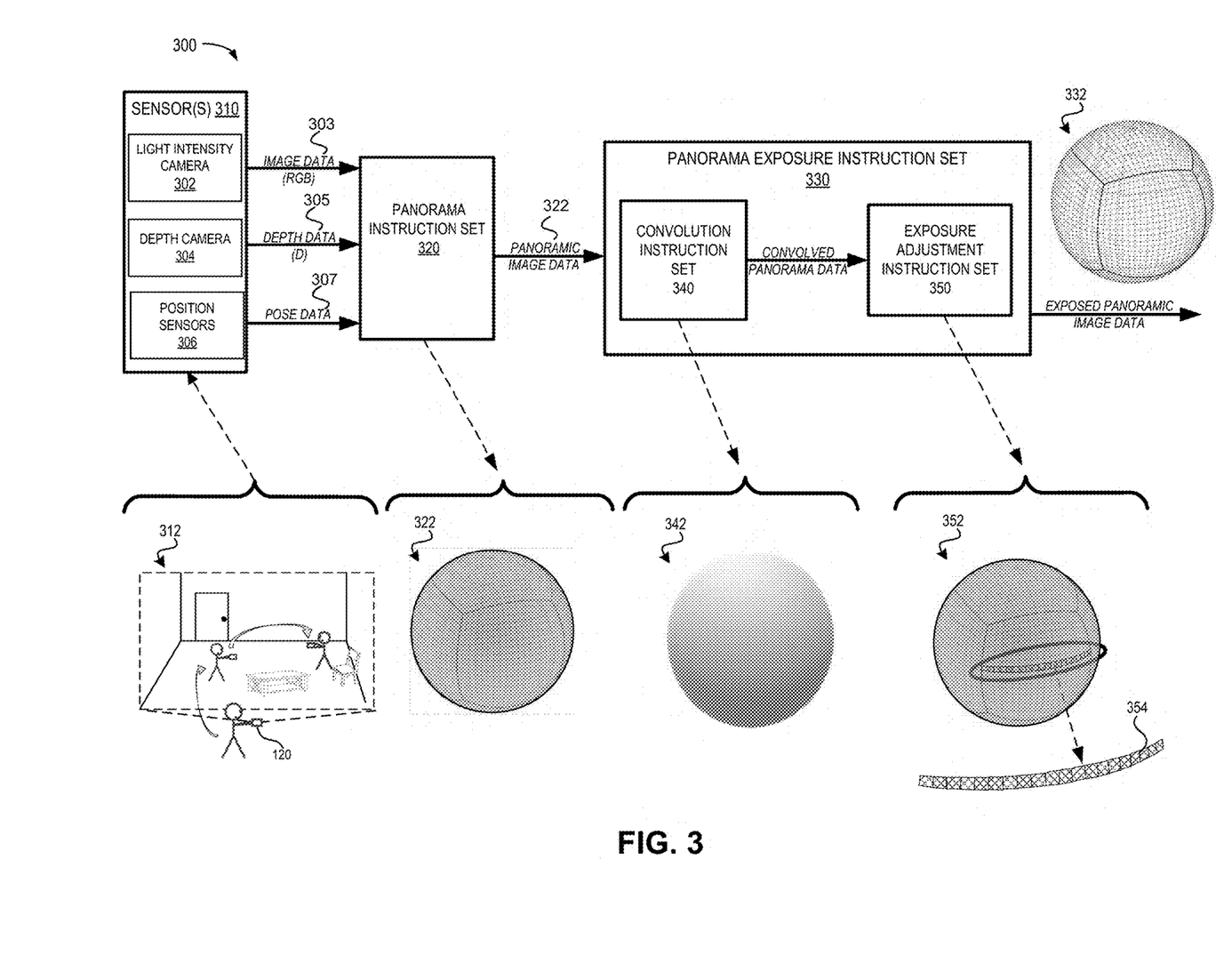
FIG. 3 illustrates a system flow diagram that can generate exposed panorama image data in accordance with some implementations.
Figure 4:
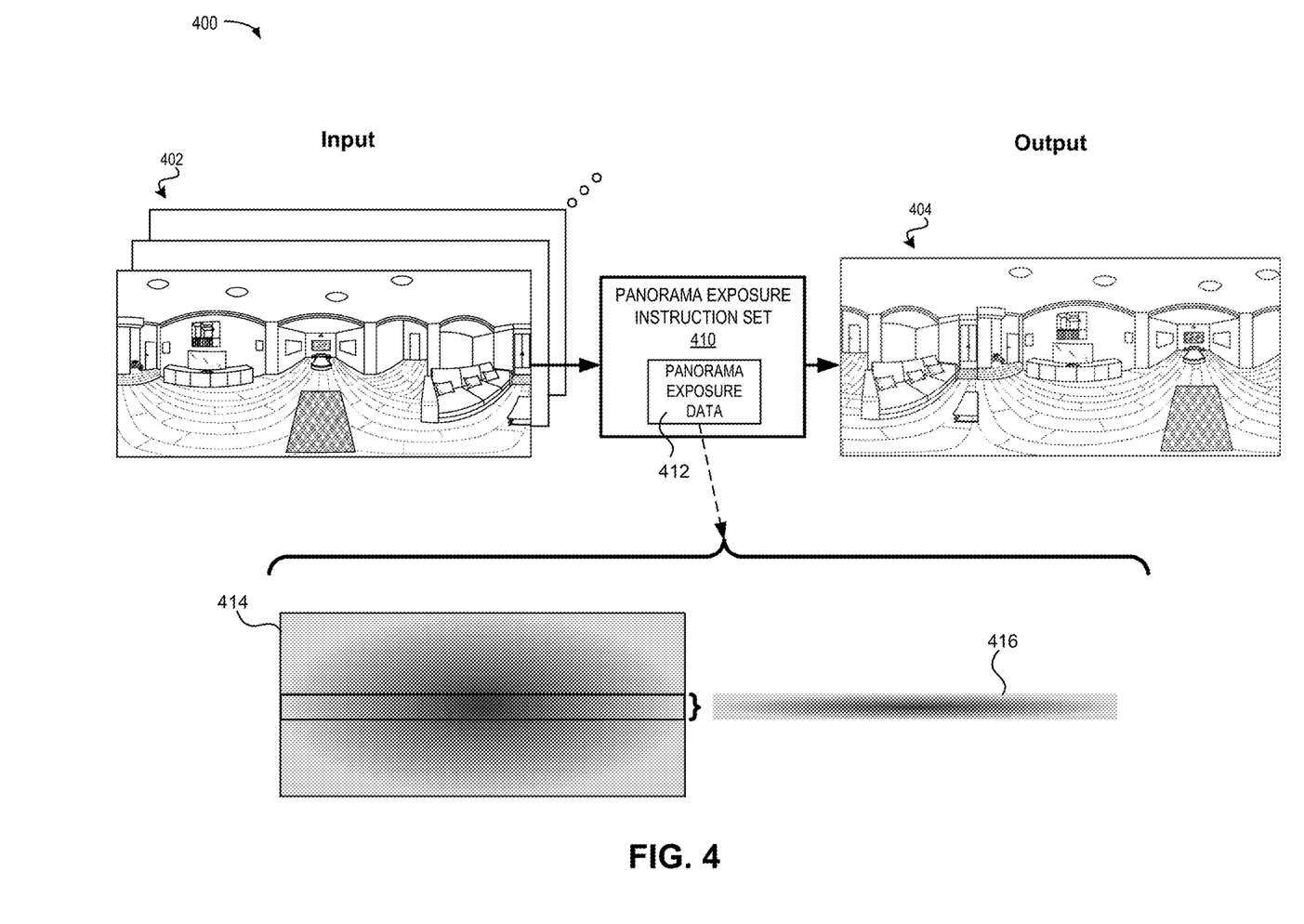
FIG. 4 illustrates an example presentation of generating exposed panorama image data in accordance with some implementations.

The exposure of panoramic image data is further described herein with reference to FIGS. 3-4. In particular, FIG. 3 illustrates a system flow diagram that illustrates acquiring image data, generating panoramic image data, and generating exposed panorama image data in accordance with techniques described herein. FIG. 4 illustrates generating panorama exposure data for generating panorama exposure image data.

FIG. 3 is a system flow diagram of an example environment 300 in which a system can generate exposed panoramic image data according to some implementations. In some implementations, the system flow of the example environment 300 is performed on a device (e.g., device 110 of FIG. 1), such as a mobile device, desktop, laptop, or server device. The images of the example environment 300 can be displayed on a device (e.g., device 110 of FIG. 1) that has a screen for displaying images and/or a screen for viewing stereoscopic images such as a head-mounted device (HMD). In some implementations, the system flow of the example environment 300 is performed on processing logic, including hardware, firmware, software, or a combination thereof. In some implementations, the system flow of the example environment 300 is performed on a processor executing code stored in a non-transitory computer-readable medium (e.g., a memory).

The system flow of the example environment 300 acquires image data from sensors of a physical environment (e.g., the physical environment 105 of FIG. 1), generates panoramic image data, assesses the panoramic image data to generate exposed panoramic image data by adjusting the exposure (i.e., contrast range) of the panoramic image data based on an area of the image (e.g., a predetermined elevation or altitude (e.g., row) of the image data after blurring the image. For example, a generating exposed panoramic image data technique described herein can be implemented on real-time panorama images that are streamed to the end user.

In an example implementation, the environment 300 includes an image composition pipeline that acquires or obtains data (e.g., image data from image source(s) such as sensors 310) of the physical environment. Example environment 300 is an example of acquiring image sensor data (e.g., light intensity data, depth data, and position information) for a plurality of image frames. For example, image 312 represents a user acquiring image data as the user scans a room in a physical environment (e.g., the physical environment 105 of FIG. 1). The image source(s) may include a depth camera 304 that acquires depth data 305 of the physical environment, a light intensity camera 302 (e.g., RGB camera) that acquires light intensity image data 303 (e.g., a sequence of RGB image frames), and position sensors 306 to acquire positioning information. For the positioning information 307, some implementations include a visual inertial odometry (VIO) system to determine equivalent odometry information using sequential camera images (e.g., light intensity data 303) to estimate the distance traveled. Alternatively, some implementations of the present disclosure may include a SLAM system (e.g., position sensors 306). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 300 includes a panorama instruction set 320 that is configured with instructions executable by a processor to generate panoramic image data 322 from sensor data. For example, the panorama instruction set 320 acquires data from sensors 310 such as light intensity image data 303 (e.g., live camera feed such as RGB from light intensity camera 302), depth image data 305 (e.g., depth image data such as depth from depth camera 304), and other sources of physical environment information (e.g., camera positioning information 307 such as position and orientation data, e.g., pose data, from position sensors 306) of a physical environment (e.g., the physical environment 105 of FIG. 1), and generates panoramic image data 322 (e.g., an environment map represented as an equirectangular image that represents a 360-degree view of the environment). For example, the panoramic image representation 322 can include a world-aligned or object-aligned or gravity-aligned environment map, e.g., represented as an equirectangular cube sphere grid (for illustration purposes). In some implementations, the panoramic image representation 322 can include pixels with each pixel including pixel characteristic data (e.g., brightness level). In some implementations, the panoramic image representation 322 (e.g., an HDR panorama image) may include floating point representations per pixel. In some implementations, each pixel may include luminance values, depth values, color attribute values, texture values, or other values descriptive of the content represented by portions of the panoramic image (e.g., a group of pixels). In some implementations, each pixel or grid of pixels (e.g., a row) of the panoramic image representation 322 can include directional information. For example, a top of the image may point to the north pole, the bottom of the image may point to the southpole, and so forth.

Alternatively, the system 300 may obtain the panoramic image data 322 from another source. In some implementations, instead of a utilizing the panorama instruction set 320 to generate the panoramic image data 322 from obtained image data (e.g., from sensors (310) of a device, such as device 110 of FIG. 1), the system 300 may include a specific sensor for capturing panoramic image data to send to the panorama exposure instruction set 330. For example, the sensors 310 may include a panoramic sensor (e.g., an HDR panoramic camera) for capturing the panoramic image data (e.g., panoramic image data 322).

In an example implementation, the environment 300 includes a panorama exposure instruction set 330 that is configured with instructions executable by a processor to generate exposed panoramic image data using one or more techniques disclosed herein. For example, the panorama exposure instruction set 330 obtains panoramic image data (e.g., panoramic image data 322 of a physical environment such as the physical environment 105 of FIG. 1) from the panoramic image data instruction set 320 (or from another source) and generates exposed panoramic image data 332. For example, the panorama exposure instruction set 330 can automatically establish the exposure for each panorama of a large volume of high dynamic range (HDR) panoramas. This exposed panoramic image data generation process of example environment 300 is further described herein with reference to FIG. 4.

In some implementations, the panorama exposure instruction set 330 includes a convolution instruction set 340 that is configured with instructions executable by a processor to assess the panoramic image data 322 from the panorama instruction set 320 to generate a convolved representation of the panoramic image data. For example, the convolution instruction set obtains and analyzes panoramic image data and generates a convolved representation of the panoramic image data (e.g., blurred image data). For example, image 342 depicts a graphical example of convolved panorama data of the panoramic image data 322. The convolution instruction set 340 can compute a diffuse convolution of the panorama data and generate a blurred image of the panorama image data. Blurring the image can avoid sampling challenges that may occur if very bright or very dark points are missed in the panoramic image data 322. For example, the convolution instruction set 340 may use convolution filters at each pixel and use the local neighboring pixels to compute a weighted average, and each pixel is used multiple times by its neighbors. Alternatively, as opposed to diffuse convolution as the main convolution methodology used as described herein, in some implementations, a diffuse convolution with an added power function may also appropriate be used.

In an example implementation, the panorama exposure instruction set 330 includes an exposure adjustment instruction set 350 that is configured with instructions executable by a processor to obtain the panoramic image data 322 and the convolved panorama data 342 from the convolution instruction set 340, select an area of the convolved panorama data, and generate an exposure (i.e., a shift to the contrast range) for the panoramic image data based on the selected area of the blurred panoramic image data. In some implementations, the exposure adjustment instruction set 350 can select a horizontal slice, such as a brightest row, for the area of the convolved panorama data. For example, as shown in image 352, row 354 is selected as the area (e.g., a horizontal row) of the panoramic image data 322 that may be representative of many or all horizontal directions to provide a more comprehensive exposure adjustment.

In some implementations, altering the panoramic image data by the exposure adjustment instruction set 350 may include computing an average color of the selected area of the blurred panoramic image data. Additionally, or alternatively, determining the exposure for the panoramic image data by the exposure adjustment instruction set 350 may include computing the average luminance based on the average color. Additionally, or alternatively, determining the exposure for the panoramic image data by the exposure adjustment instruction set 350 may further include inverting the average luminance and multiplying the panoramic image data by the inverted average luminance. The generating exposed panoramic image data process of example environment 300 is further described herein with reference to FIG. 4.

In some implementations, the panorama exposure instruction set 330 further involves picking a fixed elevation that can be used consistently across a broad dataset or in time. Alternatively, in some implementations, the panorama exposure instruction set 330 further involves searching for the brightest result within a row in the blurred (e.g., convolved) panorama, and using the corresponding row or area for generating an exposure (i.e., a shift to the contrast range) for the panoramic image data.

In some implementations, the panorama exposure instruction set 330 further involves rendering a view based on the panoramic image data and the determined exposure for the panoramic image data. In some implementations, the view is rendered live during streaming of the panoramic image data. For example, during a live streaming of a sporting event, such as a basketball game, augmented reality content could be generated (e.g., a shot clock on the basketball floor) using the real-time capture of panoramic image data. The adjusted exposure of the panoramic image data allows the generation of the computer-generated content to be better (e.g., realistically) rendered for optimal viewing performance for the end user (e.g., fans watching games at home).

FIG. 4 is a block diagram illustrating a presentation of generating exposed panorama image data of an environment in accordance with some implementations. In particular, FIG. 4 illustrates an example environment 400 in which a panorama exposure instruction set 410 (e.g., panorama exposure instruction set 330 of FIG. 3) can obtain/receive panoramic image data 402, perform a convolution (e.g., blurring) for the panoramic image data 402 as shown in image 414, determine panorama exposure data 412 by selecting a particular area 416 (e.g., a horizontal row), and generate exposed panoramic image data 404. For example, the input data of the panoramic image data 402 (e.g., panoramic image data 322 of FIG. 3) represents multiple panoramic images of an environment that the panorama exposure instruction set 410 can expose in real-time or near real-time. The panorama exposure instruction set 410 obtains panoramic image data (e.g., panoramic image data 402 of a physical environment such as the physical environment 105 of FIG. 1) from a source (e.g., the panoramic image data instruction set 320) or a camera sensor (e.g., a panoramic camera) and generates exposed panoramic image data 404. For example, the panorama exposure instruction set 410 can automatically establish the exposure for each panorama of a large volume of high dynamic range (HDR) panoramas. The panorama exposure instruction set 410 generates a convolved representation of the panoramic image data (e.g., blurred image data) as shown in image 414. Then the panorama exposure instruction set 410 selects an area of the convolved panorama data, and generates an exposure (i.e., a shift to the contrast range) for the panoramic image data based on the selected area of the blurred panoramic image data. As shown in FIG. 4, area 416 (e.g., a horizontal row) is selected. This selection of area 416 may be based on a predetermined elevation or altitude. Alternatively, the area 416 (e.g., a row) may be selected as a representative of many and/or all horizontal directions to provide a more comprehensive exposure adjustment. For example, area 416 may be selected because it was the brightest row. Additionally, or alternatively, area 416 may be selected based on other characteristics of the panoramic image data. For example, area 416 may be selected based on luminance values, depth values, color attribute values, texture values, and/or other values descriptive of the content represented by portions of the panoramic image (e.g., a group of pixels).

Figure 5:
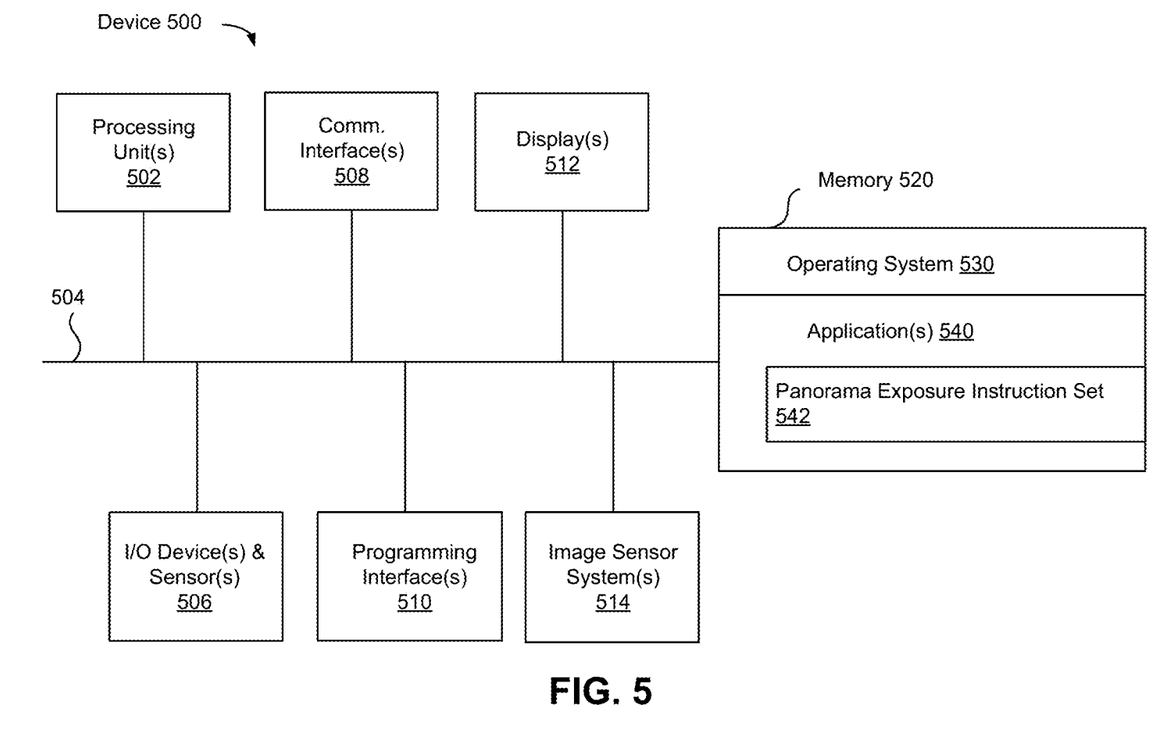
FIG. 5 is an example device in accordance with some implementations.

FIG. 5 is a block diagram of an example device 500. Device 500 illustrates an exemplary device configuration for device 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units 502 (e.g., microprocessors, ASICs, FPGAs, GPUs, CPUs, processing cores, and/or the like), one or more input/output (I/O) devices and sensors 506, one or more communication interfaces 508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 510, one or more displays 512, one or more interior and/or exterior facing image sensor systems 514, a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 512 are configured to present a view of a physical environment or a graphical environment to the user. In some implementations, the one or more displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 512 correspond to diffractive, reflective, polarized, holographic, etc. waveguide displays. In one example, the device 500 includes a single display. In another example, the device 500 includes a display for each eye of the user.

In some implementations, the one or more image sensor systems 514 are configured to obtain image data that corresponds to at least a portion of the physical environment 105. For example, the one or more image sensor systems 514 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 514 further include illumination sources that emit light, such as a flash. In various implementations, the one or more image sensor systems 514 further include an on-camera image signal processor (ISP) configured to execute a plurality of processing operations on the image data.

In some implementations, the device 110 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 10 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 110.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 includes a non-transitory computer readable storage medium.

In some implementations, the memory 520 or the non-transitory computer readable storage medium of the memory 520 stores an optional operating system 330 and one or more instruction set(s) 540. The operating system 530 includes procedures for handling various basic system services and for performing hardware dependent tasks. In some implementations, the instruction set(s) 540 include executable software defined by binary information stored in the form of electrical charge. In some implementations, the instruction set(s) 540 are software that is executable by the one or more processing units 502 to carry out one or more of the techniques described herein.

The instruction set(s) 540 include a panorama exposure instruction set 542. The instruction set(s) 540 may be embodied as a single software executable or multiple software executables.

The panorama exposure instruction set 542 (e.g., panorama exposure instruction set 330 of FIG. 3) is executable by the processing unit(s) 502 to generate exposed panorama image data (e.g., exposed panorama image data 332 of FIG. 3). For example, the panorama exposure instruction set 542 obtains panoramic image data (e.g., panoramic image data 322 of a physical environment such as the physical environment 105 of FIG. 1) and generates exposed panoramic image data using techniques described herein.

In an example implementation, the panorama exposure instruction set 542 includes a convolution instruction set and an exposure adjustment instruction set. The convolution instruction set (e.g., convolution instruction set 340 of FIG. 3) is configured with instructions executable by a processor to generate a convolved representation of panoramic image data. For example, the convolution instruction set obtains and analyzes panoramic image data, and generates a convolved representation of the panoramic image data (e.g., blurred image data). The exposure adjustment instruction set (e.g., exposure adjustment instruction set 350 of FIG. 3) is configured with instructions executable by a processor to generate exposed panorama image data. For example, the exposure adjustment instruction set obtains convolved panorama data and the panoramic image data, selects an area of the convolved panorama data (e.g., a horizontal slice, such as a brightest row), and generates an exposure (i.e., a shift to the contrast range) for the panoramic image data based on the selected area of the blurred panoramic image data.

Although the instruction set(s) 540 are shown as residing on a single device, it should be understood that in other implementations, any combination of the elements may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

According to some implementations, the device 500 (e.g., device 110 of FIG. 1) may generate and present an extended reality (XR) environment to their respective users. A physical environment refers to a physical world that people can sense and/or interact with without aid of electronic systems. The physical environment may include physical features such as a physical surface or a physical object. For example, the physical environment corresponds to a physical park that includes physical trees, physical buildings, and physical people. People can directly sense and/or interact with the physical environment, such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect rotational head movement and, in response, adjust graphical content and an acoustic field presented to the person in a manner similar to how such views and sounds would change in a physical environment. As another example, the XR system may detect rotational or translational movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), adjustments to characteristic(s) of graphical content in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   at an electronic device having a processor:
      obtaining panoramic image data comprising pixel values corresponding to light received by one or more image capture devices from multiple angles in a physical environment;
      generating blurred panoramic image data by adjusting the individual pixel values based on values of a subset of other values of the pixel values;
      selecting an area of the blurred panoramic image data, wherein the selected area is representative of the panoramic image data for exposure determination and is selected based on a visual attribute; and
      determining an exposure corresponding to a shift in contrast range for the panoramic image data based on the visual attribute of the selected area of the blurred panoramic image data.

2. The method of claim 1, wherein determining the exposure for the panoramic image data comprises:
   computing an average color of the selected area of the blurred panoramic image data;
   computing an average luminance based on the average color;
   inverting the average luminance; and
   multiplying the panoramic image data by the inverted average luminance.

3. The method of claim 1, wherein selecting the area of the blurred panoramic image data comprises:
   selecting portions of the panoramic image data representative of all horizontal directions.

4. The method of claim 1, wherein selecting the area of the blurred panoramic image data comprises:
   selecting portions of the panoramic image data corresponding to a selected altitude.

5. The method of claim 1, wherein selecting the area of the blurred panoramic image data comprises:
   determining brightness values of multiple portions of the image data corresponding to different altitudes; and
   selecting the area of the blurred panoramic image data by identifying a portion of the multiple portions based on the brightness values.

6. The method of claim 1, wherein generating blurred panoramic image data comprises performing a weighted integration, using a wide-angled weighted blurring technique, or using a diffuse convolutional technique.

7. The method of claim 1, wherein the panoramic image data comprises spherical data representing a full 360-degree view of the physical environment from an image capture position.

8. The method of claim 7, wherein the spherical data has a cuboid format or equirectangular format.

9. The method of claim 1, wherein the panoramic image data is high dynamic range (HDR) data.

10. The method of claim 1, further comprising sending a communication to the one or more image capture devices based on the exposure, wherein the image capture devices adjust image capture parameters based on the communication.

11. The method of claim 1, further comprising rendering a view based on the panoramic image data and the determined exposure for the panoramic image data.

12. The method of claim 11, wherein the view is rendered live during streaming of the panoramic image data.

13. The method of claim 1, further comprising rendering a computer-generated object in a view of the physical environment based on the determined exposure.

14. A device comprising:
    memory; and
    one or more processors coupled to the memory, wherein the memory comprises program instructions that, when executed on the one or more processors, cause the device one or more processors to perform operations comprising:
       obtaining panoramic image data comprising pixel values corresponding to light received by one or more image capture devices from multiple angles in a physical environment;
       generating blurred panoramic image data by adjusting the individual pixel values based on values of a subset of other values of the pixel values;
       selecting an area of the blurred panoramic image data, wherein the selected area is representative of the panoramic image data for exposure determination and is selected based on a visual attribute; and
       determining an exposure corresponding to a shift in contrast range for the panoramic image data based on the visual attribute of the selected area of the blurred panoramic image data.

15. The device of claim 14, wherein determining the exposure for the panoramic image data comprises:
    computing an average color of the selected area of the blurred panoramic image data;
    computing an average luminance based on the average color;
    inverting the average luminance; and
    multiplying the panoramic image data by the inverted average luminance.

16. The device of claim 14, wherein selecting the area of the blurred panoramic image data comprises:
    selecting portions of the panoramic image data representative of all horizontal directions.

17. The device of claim 14, wherein selecting the area of the blurred panoramic image data comprises:

selecting portions of the panoramic image data corresponding to a selected altitude.

18. The device of claim 14, wherein selecting the area of the blurred panoramic image data comprises:

determining brightness values of multiple portions of the image data corresponding to different altitudes; and selecting the area of the blurred panoramic image data by identifying a portion of the multiple portions based on the brightness values.

19. The device of claim 14, wherein generating blurred panoramic image data comprises performing a weighted integration, using a wide-angled weighted blurring technique, or using a diffuse convolutional technique.

20. A non-transitory computer-readable storage medium, storing program instructions executable by one or more processors to perform operations comprising:

obtaining panoramic image data comprising pixel values corresponding to light received by one or more image capture devices from multiple angles in a physical environment;

generating blurred panoramic image data by adjusting the individual pixel values based on values of a subset of other values of the pixel values;

selecting an area of the blurred panoramic image data, wherein the selected area is representative of the panoramic image data for exposure determination and is selected based on a visual attribute; and determining an exposure corresponding to a shift in contrast range for the panoramic image data based on the visual attribute of the selected area of the blurred panoramic image data.

* * * * *